United States Patent [19]

Reppert

[11] 4,181,364

[45] Jan. 1, 1980

[54] STRENGTHENING MEANS FOR DECORATIVE AUTOMOTIVE WHEEL CENTERS

[75] Inventor: Merlyn R. Reppert, Rancho Palos Verdes, Calif.

[73] Assignee: W. R. Grace & Co., New York, N.Y.

[21] Appl. No.: 870,976

[22] Filed: Jan. 20, 1978

[51] Int. Cl.² ............................................. B60B 3/12
[52] U.S. Cl. ..................................... 301/8; 301/63 R; 301/64 SD
[58] Field of Search ......... 301/8, 37 R, 63 R, 63 DD, 301/64 R, 64 SH, 64 SD, 79; 152/37 BR, 37 W; 29/159.01

[56] References Cited

U.S. PATENT DOCUMENTS

| | | | |
|---|---|---|---|
| 2,098,668 | 11/1937 | Miller | 301/64 SD |
| 2,220,284 | 11/1940 | Roemer | 301/63 R |
| 2,625,440 | 1/1953 | Lyon | 301/37 R |
| 2,734,778 | 2/1956 | Cook | 301/8 |
| 3,625,568 | 12/1971 | Verdier | 301/63 R |

Primary Examiner—H. Grant Skaggs
Attorney, Agent, or Firm—William Kovensky

[57] ABSTRACT

The invention is applicable to automotive wheels which comprise a rim and a center, where the center comprises a "knuckle" or bent over portion, and comprises various forms of strengthening members on the rear side of the knuckle.

33 Claims, 5 Drawing Figures

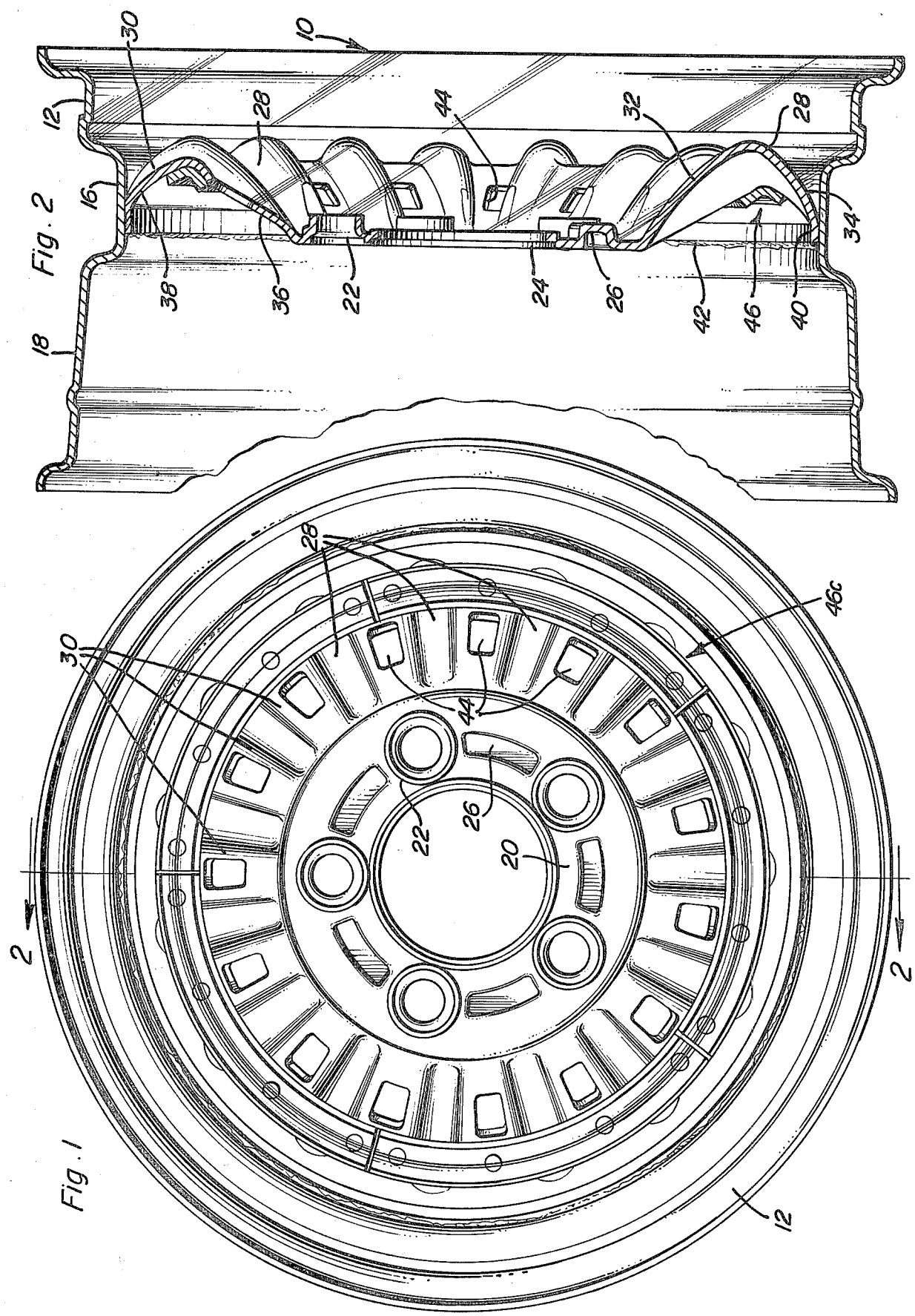

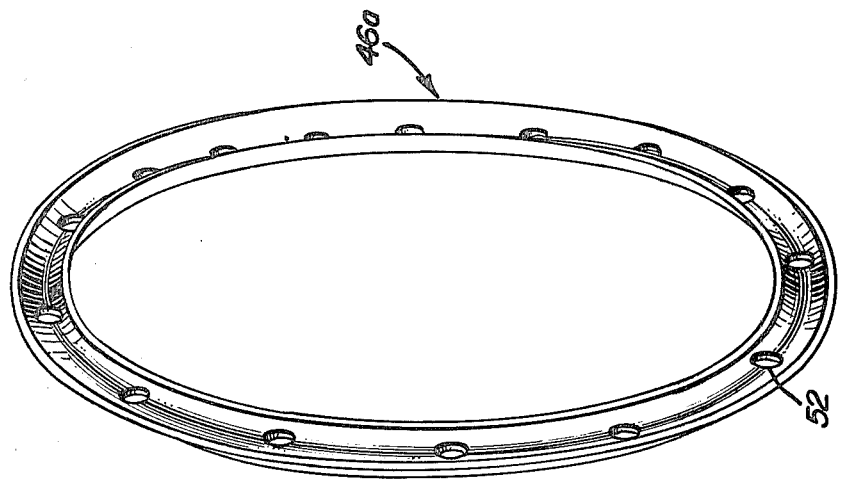
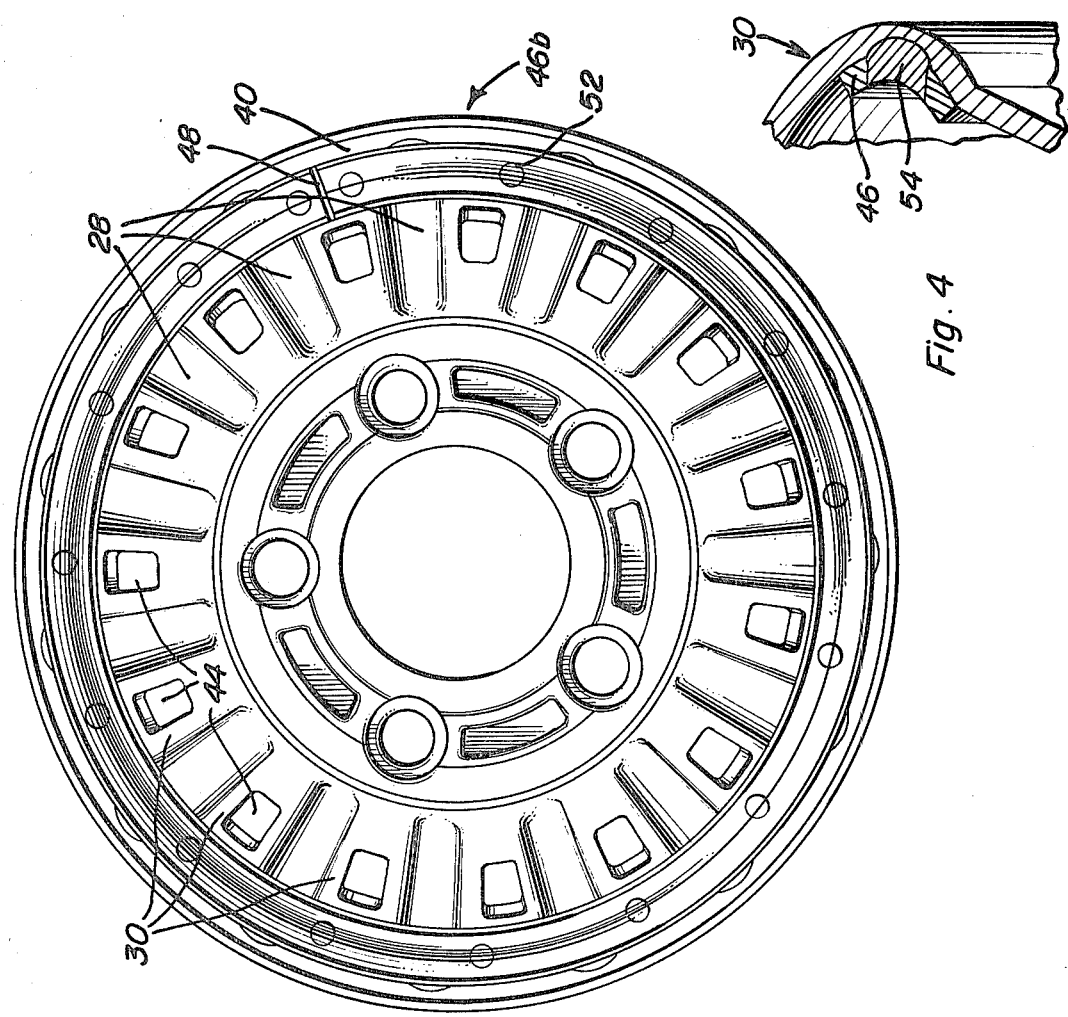

STRENGTHENING MEANS FOR DECORATIVE AUTOMOTIVE WHEEL CENTERS

This invention relates to decorative automotive wheels, and more in particular pertains to a strengthening means or structure particularly suited for certain types of such wheels.

Commerical automotive wheels are made in two basic varieties. One is the so-called "Mag" or cast wheel, usually made of aluminum rather than magnesium. Cast wheels include the rim and the center all in one piece. The present invention has not been applied to cast wheels.

The invention pertains to the second variety, known as steel wheels. These are made up of a conventional rim and a center. The center is mounted in one of many different relative positions in the rim, usually by having the edge portion of the center welded to the drop center portion of the rim. The drop center is the smallest diameter portion of the rim and is provided to permit mounting and dismounting of a tire on the rim.

The invention pertains to a particular class or type of such wheel centers, and provides means to increase strength so as to produce a wheel having highly desirable decorative qualities, while at the same time providing the strength necessary for automotive wheels.

The type of wheel center with which the invention is used is characterized by having a "knuckle" or bent over portion intermediate the radially innermost and outermost portions. This apex like structure is defined by a pair of imaginary conical surfaces on which the decorative features of a particular wheel may be impressed. The preferred embodiment is characterized by being relatively deep, front to back in an axial direction, and by a relatively large number of relatively thin rib-like structures which extend axially forwardly.

Many of the problems in producing such a wheel reside in the addition of the decorative features, such as a relatively large number of ribs and openings. The resulting center is not sufficiently strong to meet the standards imposed on vehicle wheels. Test wheels were too flexible when tested on dynamic cornering and radial fatigue machines causing premature failure, and cracking, due to excessive bending of the material. The loads imposed were beyond the yield point of the material.

These problems are solved by the addition of the various forms of the reinforcing ring structure of the invention. The invention provides several embodiments of the structural element, and combines the technique of rosette welding to achieve its advantages. The three embodiments comprise a split ring, a solid ring, and a set of five segments which together make up a ring, each having various advantages over and with respect to the others, depending upon the particular manufacturing abilities and constraints of the user of the invention.

The use of the invention ring provides an important advantage in that it allows the wheel center to be made of lighter gauge material than would be required to obtain the same strength as would be obtained with heavier gauge material without the reinforcing ring. That is, in order to get acceptable strength in the wheel center, a certain thickness of steel would be needed from which the center would be made. Utilizing the invention ring, substantially thinner material can be used and the same or even greater strength is achieved. This reduces the material requirement, reducing material wasted and weight, and correspondingly reducing cost. Additionally, the use of lighter material permits much more complex stamping operations, thus giving the wheel designer tremendous flexibility by using the invention. It is relatively easy to form certain complex shapes in light material, and it is difficult or impossible to form the same shapes in thicker material.

The above and other advantages of the invention will be pointed out or will become evident in the following detailed description and claims, and in the accompanying drawing also forming a part of the disclosure, in which FIG. 1 is a rear elevational view of a wheel embodying the preferred embodiment of the invention;

FIG. 2 is a cross-sectional view taken on line 2—2 thereof;

FIG. 3 is a view similar to FIG. 1 showing another form of the invention;

FIG. 4 is a cross-sectional view showing the detail of a rosette weld, and

FIG. 5 is a perspective view of another form of the reinforcing member.

In FIGS. 1 and 2 there is shown a wheel 10 made up of a rim 12 and a center 14. The embodiment of the wheel shown is a typical size for American automobiles, size 14×7. The same center is also used for sizes 14×6 and 14×8, and a slightly larger outside diameter on the centers allows its use in many other sizes of wheels.

The rim 12 is a standard item and comprises a drop center portion 16, which is the smallest diameter part of the rim. The drop center portion is asymmetrically placed along the length of the rim axially, defining a large or deep flange side 18, and a shallow flange side on the opposite end. As shown in the drawing, the center 14 is mounted facing the shallow side. It could as well be mounted in the opposite direction, that is it could be deep set, if such were desired by the wheel manufacturer. The rim need not be described in any greater detail herein.

The center 14 is made up of a middle flange or plate section 20 in which are mounted a plurality of upstanding bosses or short tubular sections 22 which receive the bolts by which the wheel is mounted on the vehicle wheel hub. Portion 20 also includes an inner strengthening rib portion 24, and a set of five upstanding bosses or offset protions 26 which serve to stiffen the middle 20. A five-lug wheel is illustrated, thus, five of the bolt sleeves 22 are provided and these alternate with a set of five of the strengthening recesses 26.

The structure of the portions 22, 24 and 26 in the middle of the wheel center is only one form of the invention, although it is the preferred form. In other environments, the conventional conical type of bolt opening in a flatter center without the boss sections 24 and 26 could be used, as is well known to those skilled in the art.

Moving outwardly from middle portion 20 the wheel center 14 comprises a set of relatively thin, relatively high ribs 28. The alternate spaces between each two ribs is a land portion 30. As is best shown in FIG. 2, in the cross section at the bottom, each rib 28 has a front long tapered portion 32 and a back more steeply angled shorter portion 34. The lands 30 have a similar structure comprising a front face 36 and a back face 38. As shown in FIG. 2, the peaks or high points formed at the junction of the faces 36 and 38 of the lands 30 are below and between the peaks formed by the junctions of the front and back faces 32 and 34 of the ribs 28. The bottoms or outer most portions of the back portions of the back faces 34 and 38 of the ribs and the lands merge together at a flange 40. It is this flange which attaches to the drop center portion 16 of the rim whereby the center and the rim are joined together to form the wheel 10. The flange 40 is continuous all around the center 14, as indicated by FIG. 2. A weld bead 42 is used to join the center and the rim together. Alternate means, such as swagging, spot welds, mechanical interfitting portions, or the like could as well be used as is well known to those skilled in the arts.

The invention is particularly adapted for use in those wheels which have, actually or functionally, tapering conical surfaces. If it be imagined that the ribs 28 were removed and the wheel center was made up solely of the lands, then it can be seen that there would be a front conical surface made up of the front surfaces 36, it being assumed the windows were not punched out, which joins the surface 30 tapering back, the two conical surfaces defining a peak region intermediate the outer flange 40 and the inner section. This structure would be extremely strong because it is made up of two conical surfaces joined at their bases. Addition of the decorative ribs 28 distorts this ideal situation and the wheel is further weakened by the addition of the windows 44. The addition of any of the embodiments of the structural member 46 of the invention functionally returns the wheel center to the ideal configuration set forth above, thus greatly increasing its strength.

Thus, in general terms, the invention is particularly suitable in wheels having a pair of sloping surfaces, one sloping radially inwardly and backwardly and the other sloping radially outwardly and backwardly, the two surfaces meeting at a peak or apex region located intermediate the outermost and innermost portions of the wheel center. In all such configurations the invention, which ties the bottom sections together and bridges across the rib sections to thereby return the wheel center functionally to the ideal condition, is useful.

As used in the specification and claims herein, the term "apex region" or the like shall be understood to mean the bend-over, "knuckle", or top formed by such a pair of sloping conical surfaces. As can be seem from the drawings, the cross-sectional shape of the member 46 in all three embodiments is V-like, which permits it to fit more closely into the apex region of the wheel center.

The embodiment shown has 15 ribs, however the invention can be used with more or fewer than 15, the presence of the disrupted conical structures, as described above, being the primary hallmark of the type of structure with which the invention has the greatest utility.

Each of the front faces 36 of the lands 30 is provided with a window or opening 44. This opening is provided primarily for decorative purposes, although the thinking of some experts is that such openings permit the flow of air through the wheel to cool the brakes. Other experts feel that axial air flow in a rotating wheel is very small and thus negligible cooling of the brakes is provided. In any case, in the present invention, these windows or openings are provided because they are part of the overall design of the wheel. These windows weaken the wheel because metal is removed. The windows 44 and the ribs 28, and it is thought the windows or the ribs, create the need for the primary feature of the invention, the strengthening or reinforcing members 46 described below.

In the particular embodiment shown, the 15 ribs and lands are a whole number multiple of the five bolt holes, and the sleeves 22 were made to align with a land area rather than a rib because it is thought that in this way the forces will be transmitted via the two ribs flanking the bolt hole rather than primarily by a single rib, as would probably be the case if the sleeves aligned with the ribs.

A major feature of the invention is the provision of strengthening or reinforcing means located on the back of the wheel center located at the apex regions of the land portions 30, secured thereto, and bridging across the spaces defined by the rib portions 28. This structure is clear from a comparison of the top and bottom of FIG. 2. The distance between the height of the junction of the walls 32 and 34 of the rib 28 over the reinforcing structure 46 can be seen, the positioning of the means 46 closely against the bottom of the land appearing at the top.

FIG. 5 shows a first embodiment 46A of the reinforcing ring of the invention. Another form 46B is shown in FIG. 3 and this form comprises a slit ring which is joined together at a welded section 48. A third embodiment 46C is shown in FIG. 1 and this form comprises a plurality of individual segments.

In all three embodiments, rosette welding is advantageously used. This type of welding is preferred because the weld area is completely contained thus minimizing places where cracks may begin, the amount of welding material needed is minimized, it adapts easily to use with automatic machinery and processes, and it places the weld at the apex of section 30 for greater strength. The region of a weld, rather than the weld itself, is often a place for cracks to start in members which are cyclically stressed like a wheel, and the rosette welds eliminate those potential crack inducing locations.

Referring to FIG. 4, any one of the rings 46 is shown in position at the inside of the apex region of the center land portions 30. One of the openings 52 present in all embodiments of the ring 46 is shown as being filled with a rosette weld 54.

Each of the forms 46A, 46B and 46C of the strengthening ring 46 of the invention is manufactured in a different way and each has its own advantages. The closed circle ring 46A is the most difficult and expensive to manufacture in that it is stamped out of solid material. A substantial amount of waste is engendered in this form of the invention. The corresponding advantage is that its strength is greatest, and the assembly of the ring 46A into the wheel center is the simplest.

The embodiment 46B having a single split may be rolled from strip stock and formed continuously. The rolling and shaping operation can be done on automated machinery, pieces being cut off into lengths as required, and the holes being made anywhere in the process it is most convenient. This form 46B has the advantage that no waste at all is engendered in its manufacture, however, a substantial amount of capital machinery is required for the rolling, bending and cutting operations.

The multi-segment embodiment 46C can be formed in an automatic stamping operation, using progressive dies, wherein arc shaped segments are stamped out, bent along their length, the holes for the rosette welds formed, with the pieces or segments being produced continuously. The advantages are that this is a simple manufacturing technique; the disadvantage is that five (in the example shown, fewer or more could be used in other embodiments) segments are needed to make the ring. This is the currently preferred embodiment because of its ease of manufacture.

No welds are required to join the arc segments into a solid ring onto the back of the wheel center, because each segment is joined to the others by being joined near their ends to common lands. The same is true in 46B; see the drawings.

While the invention has been described in detail above, it is to be understood that this detailed description is by way of example only, and the protection granted is to be limited only within the spirit of the invention and the scope of the following claims.

What is claimed is:

1. A wheel made up of a tire rim joined to a wheel center, the improvement comprising strengthening means for the wheel center, said wheel center comprising an apex region positioned radially intermediate the radial innermost and the radial outermost portions of said wheel center, said wheel center having portions sloping axially rearwardly and radially outwardly from said apex portions to said radially outermost portions and portions sloping axially rearwardly and radially inwardly from said apex portions to said radial innermost portions, said strengthening means being joined to said wheel center at said apex region, wherein said wheel center is formed with a plurality of ribs extending axially forwardly of said apex portion, and said ribs being separated by an equal number of lands arranged one land between each two of said ribs, said lands being defined by said portions sloping rearwardly from said apex portion, and said ribs simulating the aforedescribed shape of said lands and each comprising a front surface sloping radially inwardly and rearwardly from said rib apex portion to said wheel center innermost portion and another portion sloping radially outwardly and rearwardly from said rib apex portion to said outermost portion.

2. The wheel of claim 1, said strengthening means comprising a plurality of arcuate segments, means to join said segments to the axially rear surface of said lands at their apex portions, said segments bridging across the spaces defined by said axially forwardly extending ribs.

3. The wheel of claim 2, said means to join said segments to said lands comprising rosette welds joining each of said segments to each land contacted by each such segment.

4. The wheel of claim 2, wherein said strengthening means comprises five of said segments together defining a substantially complete circle.

5. The wheel of claim 2, each of said segments being of "V"-like cross-sectional shape.

6. The wheel of claim 1, said strengthening means comprising a split ring, means to join said split ring to the axially rear surface of said lands at their apex portions, and said ring bridging the spaces at said rear axial surface of said lands defined by said ribs.

7. The wheel of claim 6, said means to join said ring to said lands comprising a plurality of rosette welds with at least one such weld in each of said lands.

8. The wheel of claim 6, said split ring having a "V"-like cross-sectional shape.

9. The wheel of claim 1, said strengthening means comprising a closed ring, means to join said ring to the axially rear surface of said lands at their apex portions, and said ring bridging the spaces created by said forwardly extending ribs at said axially rear surface of said lands.

10. The wheel of claim 9, and a rosette weld joining said ring to each of said lands at its axially rear surface.

11. The wheel of claim 9, said ring being of "V"-like cross-sectional shape.

12. The wheel of claim 1, and a perforation in each of said lands formed in the front radially inwardly axially rearwardly sloped surface thereof.

13. The wheel of claim 1, said radially outermost portion of said wheel center comprising a flange portion of generally cylindrical configuration and extending axially rearwardly, said flange portion joining together the radial outermost portions of all of said ribs and said lands, and weld means joining said wheel center flange to a drop center portion of said tire rim to thereby form said wheel.

14. The wheel of claim 1, said wheel center being formed with fifteen of said ribs.

15. A wheel made up of a tire rim joined to a wheel center, the improvement comprising strengthening means for the wheel center, said wheel center comprising an apex region positioned radially intermediate the radial innermost and the radial outermost portions of said wheel center, said wheel center having portions sloping axially rearwardly and radially outwardly from said apex region to said radially outermost portions and portions sloping axially rearwardly and radially inwardly from said apex region to said radial innermost portions, said wheel center further comprising protrusions formed of the material of and extending axially of said apex region, and said strengthening means being joined to said wheel center at said apex region to compensate for any loss of strength in said wheel center caused by said protrusions.

16. The wheel of claim 15, wherein said wheel center protrusions comprise a plurality of ribs extending axially forwardly of said apex portion, said ribs being separated by an equal number of lands arranged one land between each two of said ribs, said lands being defined by said portions sloping rearwardly from said apex portion, and said ribs simulating the aforedescribed shape of said lands and each comprising a front surface sloping radially inwardly and rearwardly from said rib apex portion to said wheel center innermost portion and another portion sloping radially outwardly and rearwardly from said rib apex portion to said outermost portion.

17. The wheel of claim 16, said strengthening means comprising a plurality of arcuate segments, means to join said segments to the axially rear surface of said lands at their apex portions, said segments bridging across the spaces defined by said axially forwardly extending ribs.

18. The wheel of claim 17, said means to join said segments to said lands comprising rosette welds joining each of said segments to each land contacted by each such segment.

19. The wheel of claim 17, wherein said strengthening means comprises five of said segments together defining a substantially complete circle.

20. The wheel of claim 17, each of said segments being of "V"-like cross-sectional shape.

21. The wheel of claim 16, said strengthening means comprising a split ring, means to join said split ring to the axially rear surface of said lands at their apex portions, and said ring bridging the spaces at said rear axial surface of said lands defined by said ribs.

22. The wheel of claim 21, said means to join said ring to said lands comprising a plurality of rosette welds with at least one such weld in each of said lands.

23. The wheel of claim 21, said split ring having a "V"-like cross-sectional shape.

24. The wheel of claim 16, said strengthening means comprising a closed ring, means to join said ring to the axially rear surface of said lands at their apex portions, and said ring bridging the spaces created by said forwardly extending ribs at said axially rear surface of said lands.

25. The wheel of claim 24, and a rosette weld joining said ring to each of said lands at its axially rear surface.

26. The wheel of claim 24, said ring being of "V"-like cross-sectional shape.

27. The wheel of claim 16, and a perforation in each of said lands formed in the front radially inwardly axially rearwardly sloped surface thereof.

28. The wheel of claim 16, said radially outermost portion of said wheel center comprising a flange portion of generally cylindrical configuration and extending axially rearwardly, said flange portion joining together the radial outermost portions of all of said ribs and said lands, and weld means joining said wheel center flange to a drop center portion of said tire rim to thereby form said wheel.

29. The wheel of claim 16, said wheel center being formed with fifteen of said ribs.

30. The wheel of claim 15, said strengthening means comprising a plurality of individual segments joined to the axially rear surface of said apex region, a plurality of rosette welds intermediate the ends of each such segment joining said segments to said apex region, whereby said segments together are functionally equivalent to a solid ring at said apex region.

31. The wheel of claim 15, said strengthening means comprising a split ring of "V"-like cross-sectional shape at the axially rear surface of said apex region, and a plurality of rosette welds intermediate the ends of said split ring joining said ring to said apex region.

32. The wheel of claim 15, said strengthening means comprising a closed ring of "V"-like cross-sectional shape at the axially rear surface of said apex region, and a plurality of rosette welds joining said ring to said apex region.

33. The wheel of claim 15, said radially outermost portion of said wheel center comprising a flange portion of generally cylindrical configuration and extending axially rearwardly, and weld means joining said wheel center flange to a drop center portion of said tire rim to thereby form said wheel.

* * * * *